Figure 1:
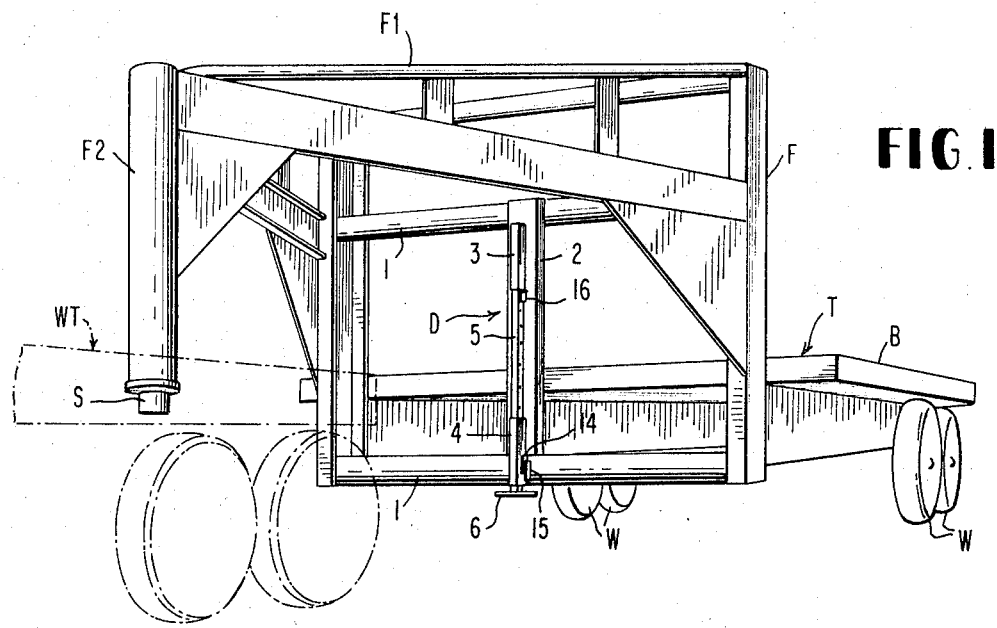

United States Patent [19]
Hewett

[11] 3,873,126
[45] Mar. 25, 1975

[54] DEVICE FOR SUPPORTING PART OF A WHEELED VEHICLE

[76] Inventor: John C. Hewett, 4224 Cedar Mountain Dr., Waco, Tex. 76708

[22] Filed: Aug. 20, 1974

[21] Appl. No.: 498,964

[52] U.S. Cl............ 280/150.5, 254/86 H, 280/475
[51] Int. Cl................................................ B60s 9/02
[58] Field of Search........ 280/475, 150.5; 254/86 H, 254/45; 248/352, 354 H, 354 P; 214/515

[56] References Cited
UNITED STATES PATENTS

| | | | |
|---|---|---|---|
| 2,529,292 | 11/1950 | Greenfield | 248/354 P |
| 3,275,298 | 9/1966 | Hand | 214/515 X |
| 3,549,125 | 12/1970 | Hamilton | 254/86 |
| 3,709,467 | 1/1973 | Mann | 254/45 |

Primary Examiner—David Schonberg
Assistant Examiner—R. Schrecengost
Attorney, Agent, or Firm—Baldwin, Wight & Brown

[57] ABSTRACT

A device for at least partially supporting the usually forward frame part of a wheeled vehicle, such as a goose-neck trailer, includes two vertically spaced guides on the frame part and a prop guided for vertical movements selectively to an elevated position with the prop lower end clear of the ground, and to a lowered position for engagement with the ground. Means is provided for fixing the prop in its elevated position for vehicle travel and for connecting it to the lower guide with the prop in a lowered position. A load supporting abutment is mounted adjacent the bottom end of the upper guide for movement to a position out of the line of movement of the prop in the guides and to a position in that line of movement. A jack positioned between the top of the prop and the abutment transmits lifting and supporting force from the prop to the upper guide and thus to the frame.

11 Claims, 3 Drawing Figures

PATENTED MAR 25 1975  3,873,126

3,873,126

DEVICE FOR SUPPORTING PART OF A WHEELED VEHICLE

BACKGROUND OF THE INVENTION

Use of tractor-trailer combinations usually requires the raising and lowering of the forward end of the trailer to couple and/or uncouple the trailer, and to support the forward end of the trailer when it is, for example, to stand and not be towed by the tractor. It has been known previously to equip trailers with extensible-retractable auxiliary supporting wheels, or simply extensible-retractable props for this purpose. Examples of prior art disclosures in this field are to be found in the U.S. Patents to Hamilton, No. 3,549,125 and to Carmel, No. 3,776,569.

SUMMARY OF THE INVENTION

The present invention provides an improved device of extremely simple, economical and effective construction which is very easily conditioned for maintaining a prop permanently mounted on a trailer in an elevated position to permit free wheeled travel of the trailer, or for enabling the prop to be used in conjunction with a jack, which may be conventional, to raise the trailer forward end, and, if desired, to hold the latter in raised position.

An object of the invention is to provide such a construction which includes a very small number of operative parts, essentially vertically spaced upper and lower guides on the trailer frame, a prop movable vertically in the guides, a movable load transmitting and supporting abutment, and a device for fixing the prop against vertical movement relative to the guides, all for use in connection with a jack, which may be conventional.

Figure 2:
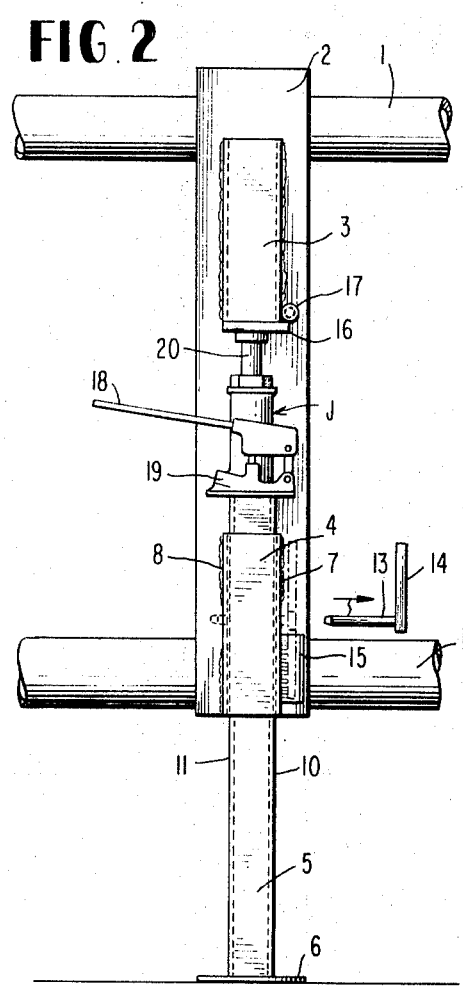
Figure 3:
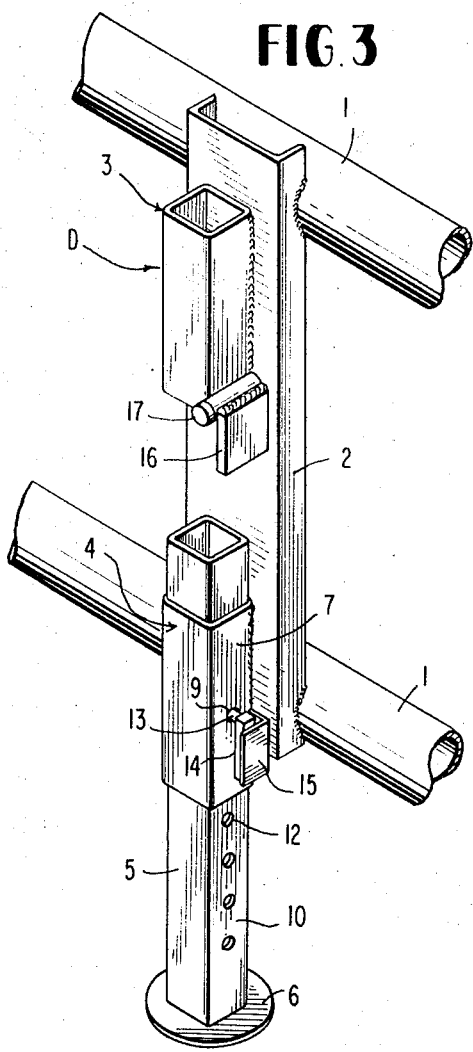

Other objects of the invention will become apparent from a reading of the following description, the appended claims, and the accompanying drawings, in which:

FIG. 1 is a perspective view showing a goose-neck trailer schematically with a device embodying the invention mounted thereon, the device being shown conditioned with a ground-engageable prop supported above and clear of the ground to permit the trailer to travel on its wheels;

FIG. 2 is an elevational view of part of the trailer frame to which the device is attached and shown with the parts conditioned for jacking the forward end of the trailer up and for thereafter being conditioned to maintain the trailer jacked up or elevated; and FIG. 3 is a fragmentary perspective view of part of the trailer frame with the device attached and conditioned for maintaining the forward end of the trailer elevated with the prop engaging the ground.

The invention is described and illustrated in connection with a goose-neck trailer generally designated T having a frame F, bed B, and wheels W generally toward the rear of the bed and frame. A forwardly extending frame structure F1 is equipped at its front end with a frame post F2 having a stub shaft S at its lower end adapted to fit in a bearing opening, not shown, in the frame of a wheeled tractor WT shown in phantom lines. The frame F includes horizontal crossmembers 1, 1 and a vertical channel 2 welded or otherwise secured to the members 1.

A presently preferred form of the device embodying the invention is generally designated D and includes vertically aligned upper and lower guides 3, 4 respectively, welded or otherwise secured to the vertical channel frame member 2, one above the other in spaced relation, that is with a substantial space between the bottom end of the upper guide 3 and the top end of the lower guide 4. In the form shown, the guides 3 and 4 are generally of hollow rectangular cross-sectional shape.

A prop 5 fitted at its lower end with a ground engageable pad 6 is mounted to be guided for vertical movements in the guides 3 and 4. In one of its selected positions, the prop 5 is elevated as shown in FIG. 1 so as to extend vertically across the space between the guides 3 and 4 and into the guide 3 with the pad 6 being disposed well above the ground, thus to permit relatively free wheeled travel of the trailer T when its stub shaft S is coupled to the wheeled tractor WT.

Fixing means are provided for maintaining the prop 5 elevated in the position shown in FIG. 1 and also for maintaining the prop in a lowered position with the pad 6 engaging the ground, as will be explained hereinafter. Two opposed sides 7 and 8 of the lower guide 4 are provided with aligned horizontal openings 9, only the opening 9 in the side 7 being visible in the drawings. Opposed sides 10 and 11 of the prop 5 are formed with a series of vertically spaced pairs of aligned horizontal apertures 12, only those in the prop side 10 being visible in the drawings. In order to maintain the prop 5 in its elevated position as shown in FIG. 1, the prop is adjusted vertically to bring a pair of apertures 12 in the lower region of the prop into registry with the aligned openings 9 in the lower guide 4, and a pin part 13 of a fixing member having a handle 14 is inserted into the aligned openings 9 and apertures 12. A keeper 15 is mounted on the lower guide 4 to prevent the fixing member from being accidentally dislodged. To enable the pin 13 to be inserted or withdrawn, the handle 14 is turned to a horizontal position; and to ensure that the fixing member will not be accidentally dislodged when in holding position, the handle 14 is turned to the vertical position behind the keeper 15 as shown clearly in FIG. 3.

It is essential that means be provided for using the prop 5 to raise the forward end of the trailer frame and in some instances to support it in its raised position. To this end, a load supporting abutment 16 is pivoted at 17 at the bottom end of the upper guide 3, in the form shown the pivot axis being horizontal. When the prop 5 is to be moved into its elevated position as shown in FIG. 1, the abutment 16 partakes of a lateral movement out of the line of movement of the prop in the guides 3 and 4, the abutment then being in an inoperative position as shown in FIG. 3. This clears the way for the prop 5 to be moved completely to its elevated position and fixed in that position as described above so that the trailer may travel without interference of the prop on the ground.

However, when the forward part of the trailer is to be lifted, for example for withdrawing the stub shaft S from the bearing in the tractor frame, the fixing pin 13 is withdrawn from the aligned openings 9 and apertures 12, and the prop 5 is lowered until there is a sufficient clearance space between the bottom end of the upper guide 3 and the top end of the prop 5 to permit the insertion of a jack J, as shown in FIG. 2. The jack may be of any conventional form, for example including an operating handle 18, a base element 19, and a movable rod element 20. The jack is inserted into the clearance space after the pivoted abutment 16 has been moved laterally to the operative position shown in FIG. 2 wherein it closes off the bottom end of the upper guide 3. Operation of the jack J with relative extending movement of its rod element 20 will bring the latter into lifting contact with the abutment 16. Since the jack base is supported on the prop 5 with the lower end of the latter engaging the ground, upward movement of the jack element 20 will transmit lifting force through the abutment 16 to the forward part of the trailer frame, thereby lifting the stub shaft S out of the bearing on the tractor.

When it is desired to retain the forward part of the trailer frame in elevated position, the jack is adjusted to bring a pair of apertures 12 in the prop 5 into registration with the opposed openings 9 in the lower guide 4 and the fixing pin 13 is then inserted. The jack may then be backed off and removed.

Lowering of the forward part of the trailer frame is accomplished by a generally reversed procedure, believed not necessary here to describe in detail.

The construction shown and described embodies the invention in a practical and the presently preferred form, but the disclosure is intended to be illustrative rather than definitive, the invention being defined in the claims.

I claim:

1. A device for at least partially supporting the frame of a wheeled vehicle when the vehicle is not completely supported by its wheel equipment, said device comprising upper and lower guides attachable to such a vehicle frame in vertically aligned relation, one above the other, with a space between the bottom end of said upper guide and the top end of said lower guide; a prop guidable vertically by both of said guides; releasable fixing means for holding said prop in an elevated position while engaging both said upper and lower guides to maintain the bottom end of said prop clear of the ground to permit the vehicle to travel on its wheel equipment; a load supporting abutment mounted at the bottom end of said upper guide for movements respectively to an inoperative position in which it is laterally displaced from the vertical line of movement of said prop in said guides thereby to permit said prop to move into its said elevated position, and to an operative position below the bottom end of said upper guide and above the top end of said lower guide and the top end of said prop when said prop is in a lowered position with its bottom end positioned for ground engagement and with its top end spaced below the bottom end of said upper guide, thereby providing a clearance space between the top end of said prop and said abutment; and a lifting jack insertable in said clearance space and having two relatively vertically movable jack elements, one for engagement with said abutment and the other for engagement with the top end of said prop, whereby relative extending movements of said jack elements will apply lifting and sustaining force to said abutment and thereby to said vehicle frame.

2. Device according to claim 1 in which said lower guide has a horizontal opening therein and said prop has a series of spaced horizontal apertures any selected one of which is alignable with the opening in said lower guide, and in which said fixing means comprises a part insertable into said opening and the selected aperture for maintaining said prop and said lower guide against relative vertical movement.

3. Device according to claim 1 in which said load supporting abutment is mounted on said upper guide at the bottom thereof to partake of said movements respectively to said operative position and said inoperative position.

4. Device according to claim 3 in which a pivot mounts said load supporting abutment on said upper guide.

5. Device according to claim 4 in which the axis of said pivot is horizontal.

6. Device according to claim 1 in which said lower guide is of hollow rectangular cross-section.

7. Device according to claim 6 in which said lower guide has opposed, aligned openings in two opposite sides thereof and said prop has a series of spaced apertures, any selected one of which is alignable with the openings in said lower guide, and in which said fixing means comprises a part insertable into said openings and the selected aperture for maintaining said prop and said lower guide against relative vertical movement.

8. In combination with a semitrailer vehicle having wheels and a frame with means on the forward part thereof for connection to a tractor, a device for selectively raising and lowering said frame forward part to enable connection of said frame to said tractor and disconnection of said frame from said tractor, and for supporting the frame forward part when it is disconnected from said tractor, said device comprising: upper and lower guides fixed with respect to said frame forward part in vertically aligned relation, one above the other, with a space between the bottom end of said upper guide and the top end of said lower guide; a prop guidable vertically by both of said guides; releasable fixing means for holding said prop in an elevated position while engaging both said upper and lower guides to maintain the bottom end of said prop clear of the ground to permit said vehicle to travel on its wheels; a load supporting abutment mounted at the bottom end of said upper guide for movements respectively to an inoperative position in which it is laterally displaced from the vertical line of movement of said prop in said guides thereby to permit said prop to move into its said elevated position, and to an operative position below the bottom end of said upper guide and above the top end of said lower guide and the top end of said prop when said prop is in a lowered position with its bottom end positioned for ground engagement and with its top end spaced below the bottom end of said upper guide, thereby providing a clearance space between the upper end of said prop and said abutment; and a lifting jack removably inserted in said clearance space and having two relatively vertically movable jack elements, one engaging said abutment and the other engaging said prop, whereby relative extending movements of said jack elements will apply lifting and sustaining force to said abutment and thereby to said forward part of said vehicle frame.

9. Device according to claim 8 in which said lower guide has a horizontal opening therein and said prop has a series of spaced horizontal apertures any selected one of which is alignable with the opening in said lower guide, and in which said fixing means comprises a part insertable into said opening and the selected aperture for maintaining said prop and said lower guide against relative vertical movement.

10. Device according to claim 8 in which said load supporting abutment is mounted on said upper guide at the bottom thereof to partake of said movements respectively to said operative position and said inoperative position.

11. Device according to claim 10 in which a pivot mounts said load supporting abutment on said upper guide.

* * * * *